United States Patent [19]
Colwell

[11] 3,738,558
[45] June 12, 1973

[54] THIN LAMINATED GASKET
[75] Inventor: Otha Leroy Colwell, Mount Prospect, Ill.
[73] Assignee: Felt Products Mfg. Co., Skokie, Ill.
[22] Filed: Sept. 2, 1970
[21] Appl. No.: 68,935

Related U.S. Application Data
[63] Continuation-in-part of Ser. No. 756,908, Sept. 3, 1968, abandoned, which is a continuation-in-part of Ser. No. 458,833, May 17, 1965, abandoned, which is a continuation-in-part of Ser. No. 385,747, July 28, 1964, abandoned.

[52] U.S. Cl............................................. 277/235 B
[51] Int. Cl.............................................. F16j 15/06
[58] Field of Search ........................ 277/235, 235 B

[56] References Cited
UNITED STATES PATENTS
| | | |
|---|---|---|
| 1,823,341 | 9/1931 | Victor .......................... 277/235 B |
| 2,029,302 | 2/1936 | Balfe ............................ 277/235 B |
| 2,034,610 | 3/1936 | Dickson ....................... 277/235 B |

FOREIGN PATENTS OR APPLICATIONS
955,215    Great Britain ................. 277/235 B Primary Examiner—Robert I. Smith
Attorney—Dressler, Goldsmith, Clement & Gordon

[57] ABSTRACT

A thin gasket for high compression engines comprises two outer metal sheets of uniform thickness within a range of from 0.0055 to 0.0085 inch and a filler having a compressible section with a total thickness no greater than 0.015 inch. The compressible section of the filler may comprise one or two sheets of impregnated fibers, and if only one sheet is used, the filler may also include a thin metal shim of the same thickness as one of the outer sheets and is positioned between the upper surface of the filler sheet and the upper outer sheet. The bottom sheet has flanges bent over the outer edges of the upper sheet and they are compressed to provide a gasket of uniform thickness totaling less than 0.030 inch.

5 Claims, 9 Drawing Figures

Patented June 12, 1973　　3,738,558
3 Sheets-Sheet 1
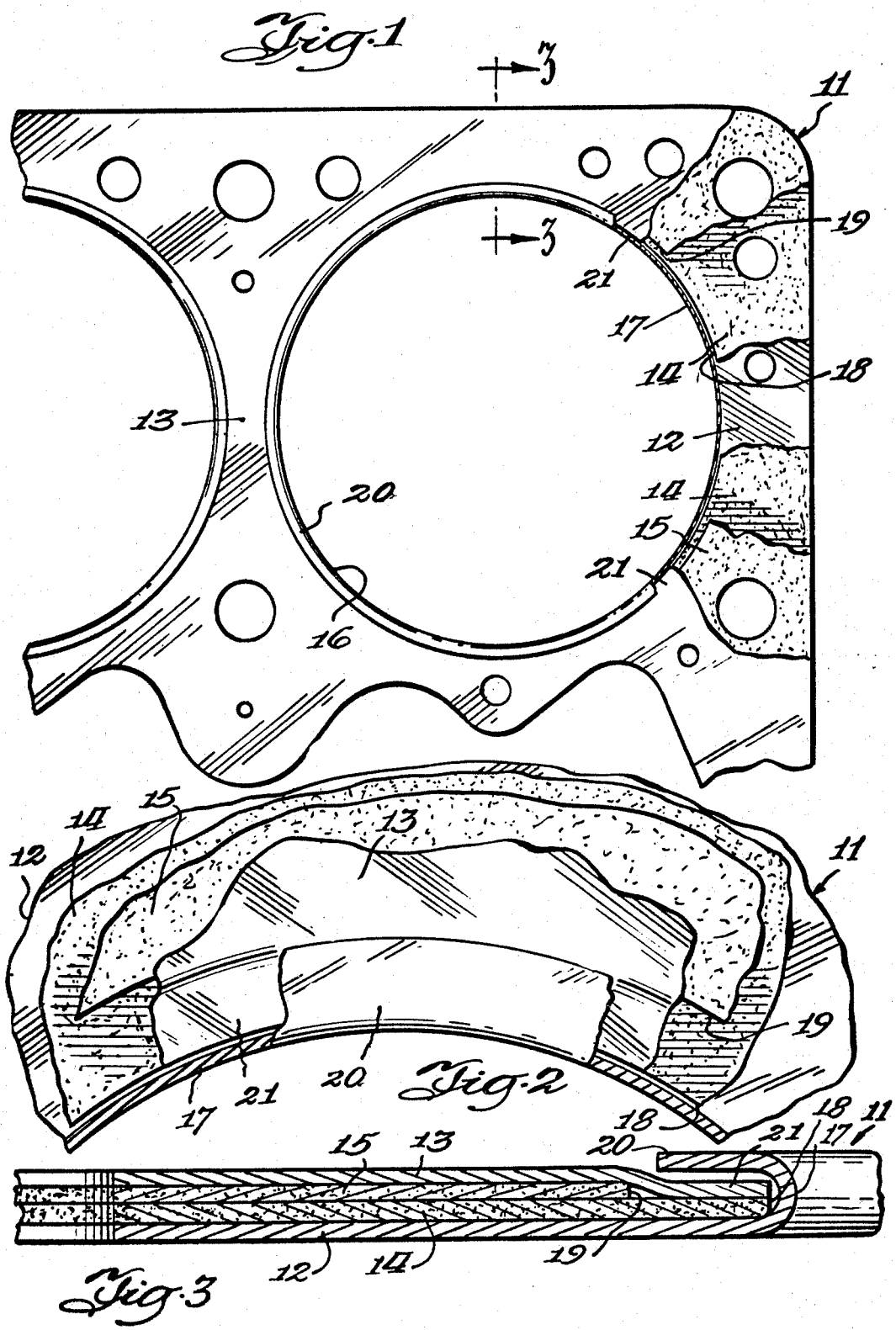

Patented June 12, 1973
3,738,558
3 Sheets-Sheet 2
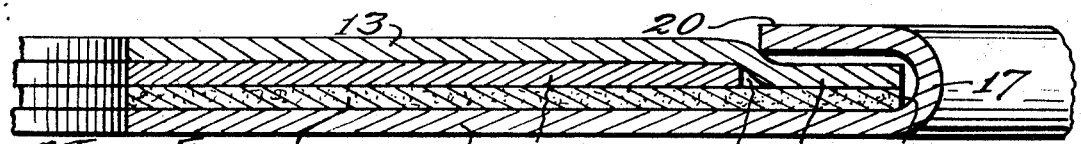
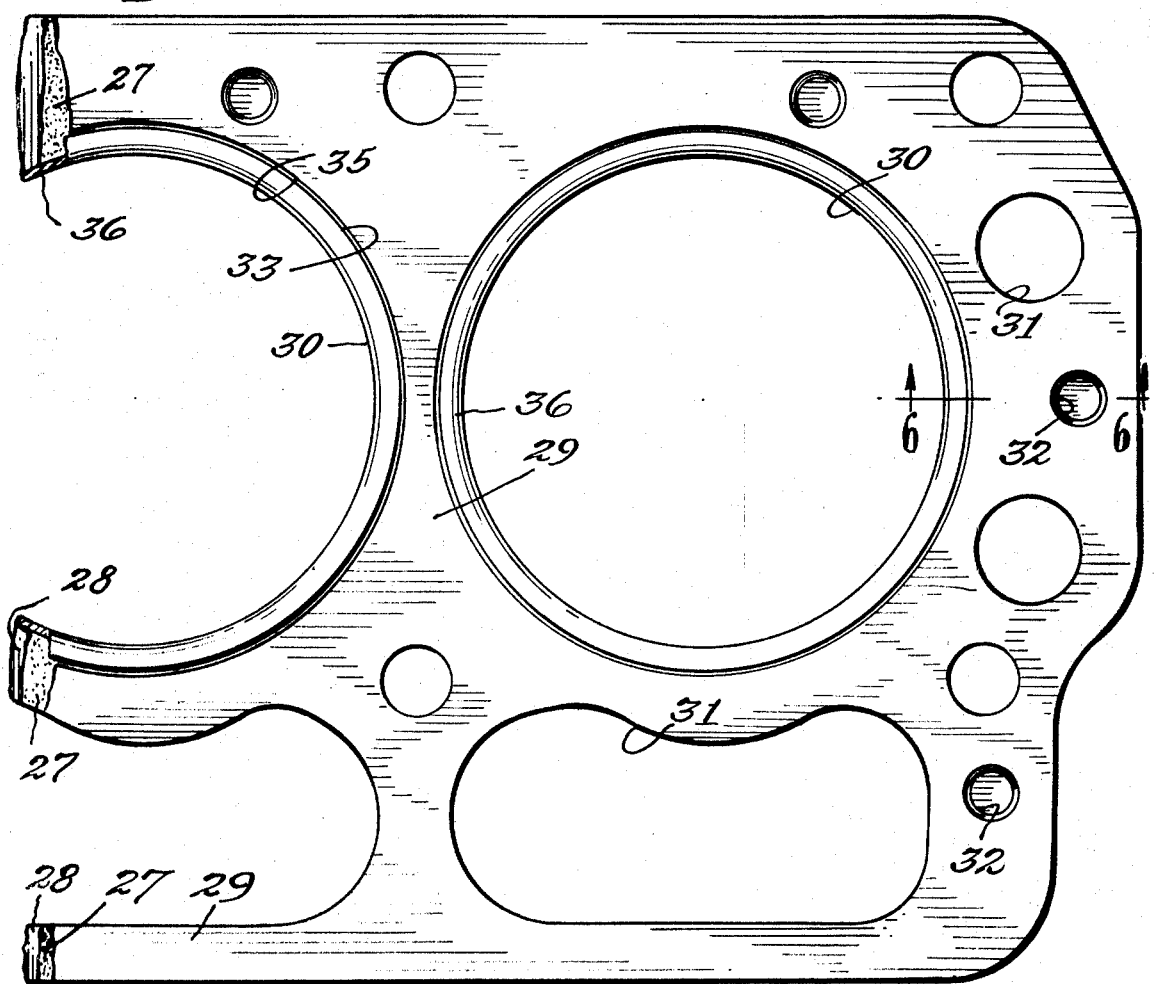
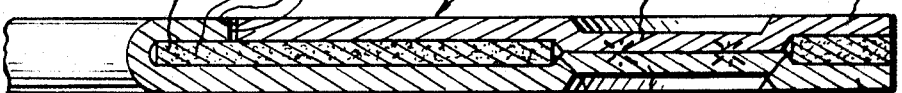
Inventor
Otha Leroy Colwell
By Dressler, Goldsmith, Clement, Gordon & Ladd
Attorneys

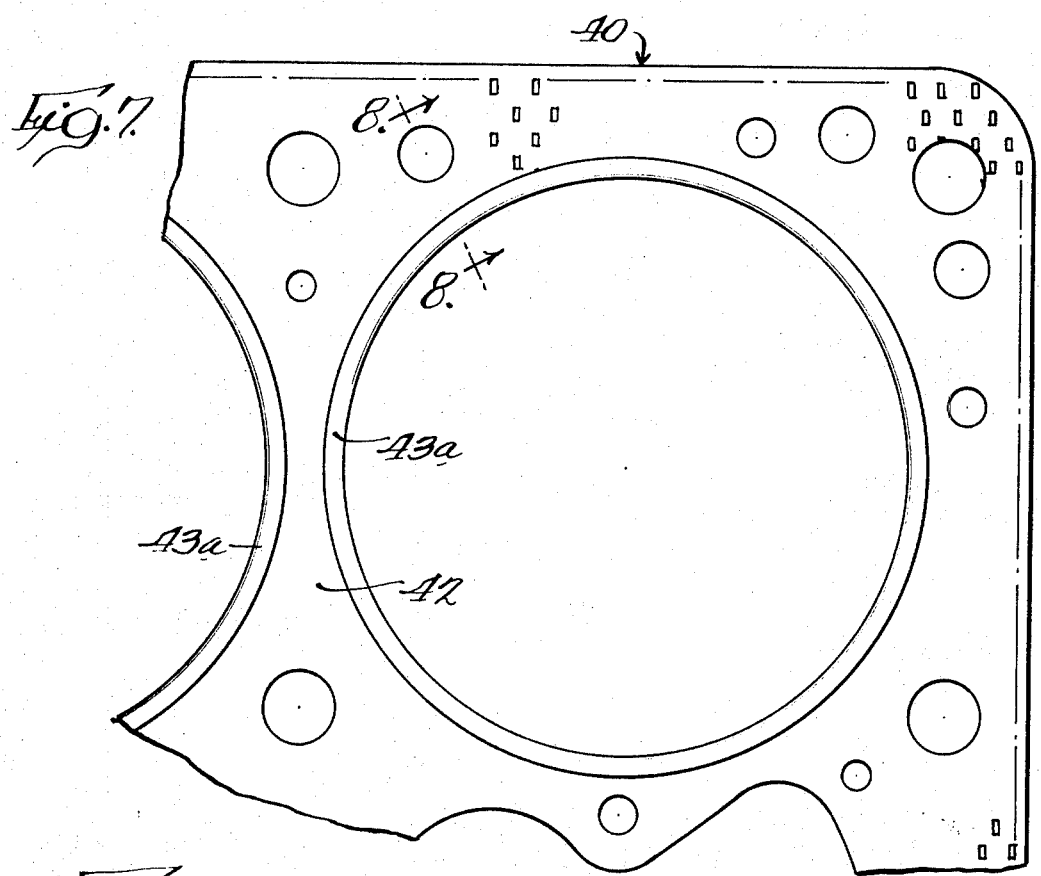
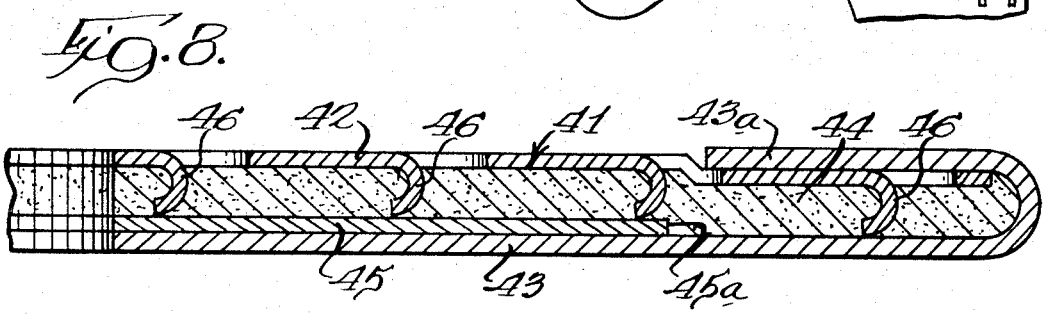
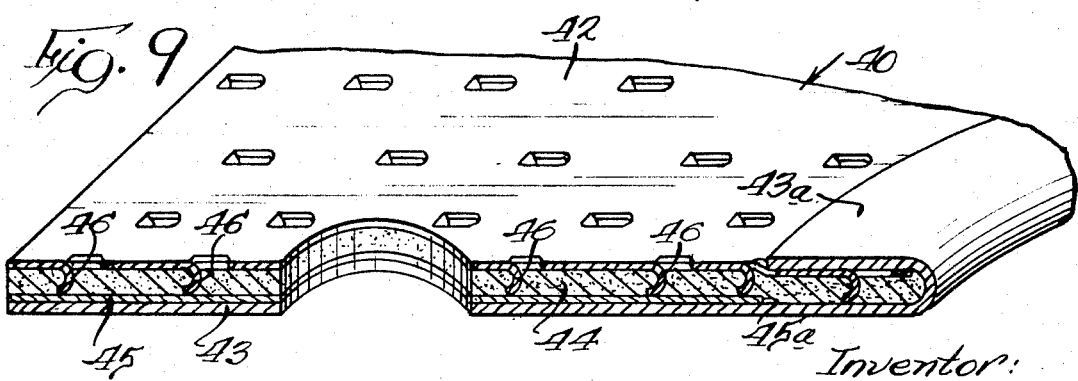

THIN LAMINATED GASKET

This application is a continuation-in-part of Colwell application Ser. No. 756,908, filed Sept. 3, 1968, now abandoned, which was a continuation-in-part of Colwell application Ser. No. 458,833, filed May 17, 1965, now abandoned, which was a continuation in part of Colwell application Ser. No. 385,747, filed July 28, 1964, now abondoned, all of said applications being assigned to the assignee of the present invention.

This invention relates to a thin laminated gasket adapted to be used between the cylinder block and the cylinder head of an engine to seal the joints around the cylinder bores and fluid passages of said engine, and is particularly concerned with means for increasing the sealing efficiency and useful life of the gasket.

The invention will be described with particular reference to gaskets for use in sealing the cylinder bores and fluid passages in high compression engines, in which environment it has special advantages. Gaskets for use in sealing high compression engines, in addition to having all the qualities generally required in gaskets, should be of limited thickness, i.e., not more than 0.030 inch, to assist in obtaining a high compression ratio. The fibers used in the compressible filler sheets of the gasket of the present invention are dimensionally stable under the temperature and pressure conditions encountered in a high compression engine. Thus, they enable the filler sheets to be made of uniform thickness within the indicated range and to substantially maintain that thickness in use, thus making possible the making of the desired thin gasket. This thin gasket provides a seal for the cylinder bores and fluid passage of a high compression engine, of an efficiency not obtainable with the gaskets of the prior art. It will be understood, however, that the invention is not limited to gaskets for use in high compression engines, and that gaskets made in accordance with the invention may be used in other environments in which they may have utility.

It has been found that gaskets having a total compressed thickness of more than 0.030 inch are not commercially desirable for use in high compression engines because they tend to reduce compression ratio rather than improve it, thereby reducing efficiency of such engines. Gaskets of the present invention provide for compression ratios much higher than conventional gaskets without impairing the efficiency of the seal. Relatively thick gaskets previously available made of a combination of metal and asbestos sheets, which have been common in this art, have not proven to be entirely satisfactory for use in high compression engines. The gasket disclosed in Victor et al. U.S. Pat. No. 2,130,110 is an example of the prior art in which the gasket is made of a plurality of metal and asbestos sheets laminated together. The total thickness of a gasket of this type is such as to render them commercially unacceptable for use in a high compression engine. Thicker gaskets also have a tendency to permit casting warpage because they cause the bolt pressure to be concentrated in the areas contiguous to the bolts, with a tendency for the gasket to gap in the areas between the bolts. The gaps in the edge of the gasket induce a bowing effect in the casting. The thin gasket does not cause gaps in the gasket edges and thus avohds the bowing effect that induces casting warpage.

It has also been found that in gaskets having a thickness greater than 0.030 inch, and particularly those wherein the compressible material of the gasket has a thickness greater than 0.015 inch, once the head has been tightened to the block and the engine has been run for a period of time, the relatively thick compressible material of the gasket has a tendency to set, and it is necessary to retighten the bolts. Gaskets constructed in accordance with the present invention, wherein the maximum thickness of the compressible section of the filler means is 0.015 inch, have exhibited surprisingly good torque retention, and it has been found that it is not necessary to retighten the bolts, even after extended periods of use.

In order to provide a gasket having a total compressed thickness of less than 0.030 inch, many automobile manufacturers have used embossed steel shims as gaskets. These embossed steel shims are inefficient as sealing gaskets for high compression engines because they depend entirely upon dimensionally precise embossments and synthetic resin surface coatings on these embossments to provide the seal. The seal is largely ineffective whenever there is any degree of irregularity in the finish of the mating casting surfaces. Although the cost of a steel gasket is nominal, the cost of the labor required to replace one in service in considerable, and the usual critical condition of casting surfaces constitutes a serious objection to its use.

One embodiment of a gasket constructed in accordance with the present invention comprises compressible filler means sandwiched between two thin outer metal sheets. The outer metal sheets are of uniform thickness within a range of from 0.0055 to 0.0085 inch, and the compressible section of the filler means has a total thickness no greater than 0.015 inch. The filler means has no cold flow characteristics and will maintain dimensional stability under the temperature and pressure conditions to which the gasket will be subjected in use in a high compression engine.

The compressible section of the filler means may comprise one or two sheets, either woven or nonwoven, of fibers impregnated with a binder capable of withstanding the action of water, ethylene glycol, alcohol, lubricating oils, steam, and radiator flush, at the temperature and pressure conditions that may be encountered when the gasket is used between the cylinder block and the head of a high compression engine. In gaskets comprising a single compressible filler sheet within the two outer metal sheets, the filler means may include a thin metal shim between the compressible sheet and the top outer metal sheet. The metal shim is preferably coated with a cured thermosetting resin.

In another embodiment, the gasket has a single compressible filler sheet and the two outer metal sheets are secured together permanently, preferably be welding, in a plurality of spaced areas near the outer edges of the gasket. In this embodiment, the filler sheet is apertured in each of the areas where the welds are to be located, and the outer metal sheets are indented to provide a metal-to-metal contact.

In a further embodiment, the filler means that is interposed between the two outer sheets is defined by a layer of impregnated fibers and a metal shim; and a plurality of projections are struck downwardly from the uppermost sheet and extend through the layer of fibers to prevent lateral shifting between the uppermost sheet and the fiber layer.

In still another embodiment, the filler means of the gasket includes a metal shim and a compressible layer of impregnated fibers in a laminated structure between two outer metal sheets, with the compressible layer being adhesively bonded to the adjacent outer metal sheet to prevent lateral shifting therebetween.

In all of the above mentioned embodiments, the compressible section of the filler means has a maximum compressed thickness of 0.015 inch, and surprisingly, such structures have sufficient compressibility to conform to head and block surfaces to provide a seal therebetween, while having such a small amount of stress relaxation to substantially completely eliminate the necessity of retorquing the cylinder head bolts once they are tightened.

The binder with which the fibers of the filler sheets are impregnated may be a synthetic elastomer or a cured thermosetting resin. The type of binder preferred depends upon the kind of fibers used in the filler means. Although either type of binder may be used with any kind of fiber, it is generally preferred to use an elastomer with asbestos fibers, and a resin with the other fibers that may be used for the filler sheets.

Asbestos fibers are preferred for the filler sheets, but natural fibers, such as, for example, cotton or flax, or synthetic fibers, such as, for example, nylon 7, may be used. With filler sheets having asbestos fibers, the binder, with which the fibers are impregnated, is preferably neoprene, but other synthetic elastomers may be used.

When cotton, flax or nylon fibers are used for the filler sheets, it is preferred to impregnate them with a thermosetting resin, such as, for example, a phenol-formaldehyde resin, melamine-formaldehyde resin, epoxy resin, etc. The filler sheets in which the fibers are impregnated with a thermosetting resin are treated to cure the resin in accordance with conventional procedures. One example of a filler sheet of this type is a nonwoven sheet of cotton fibers of uniform denier impregnated with a cured phenol-formaldehyde resin, sold commercially by Spaulding Fibre Company under the designation of Spaulding No. 33. The resin impregnated filler sheet is non-wicking and is resistant to fluids and gases.

The gasket is provided with an aperture adapted to register with each of the cylinder bores, and with openings adapted to register with all the other openings provided in the cylinder block with which it is to be used. One of the outer metal sheets of the gasket, preferably the bottom sheet, is provided with upstanding flanges that define the perimeters of each of the apertures adapted to be aligned with the cylinder bores of the engine block with which the gasket is to be used. The filler means of each embodiment includes at least one filler sheet having an edge adjacent each of the upstanding flanges. When the gasket is assembled, the upstanding flange is bent downwardly to overlap the adjacent edge of the filler sheet and to form a metal protective surface at each edge of the gasket contiguous to said apertures.

In the embodiments having either a metal shim or a second filler sheet interposed between the first mentioned filler sheet and the top metal sheet, the metal shim or the second filler sheet has its edge cut back from said apertures to allow room for the upstanding flange to be bent downwardly against the top metal sheet without overlapping the edge of the metal shim or of the second filler sheet. The flanges are bent downwardly to a uniform height, preferably by roller pressure. The flanges are bent into contact with the top metal sheet, but are not pressed tightly against it. The rim portions of the gasket may be pressed downwardly until they are flush with the body portion, but it is prefered to have the rim portion project slightly above the body portion of the gasket until the gasket is compressed in its position of use between the cylinder block and head of an engine. In this manner, particularly in those embodiments utilizing a metal shim, a structure is provided that has substantially uniform compressibility throughout its area.

The gasket is coated with a thermosetting resin in any suitable manner, as, for example, by roll coating or spraying, and is then treated to cure the resin. The surface coating of resin on the exposed faces of the gasket insures that the gasket will intimately and uniformly contact the castings. The surface coating of resin also seals the edges of the gasket contiguous to the holes that are adapted to be aligned with the various holes in the cylinder block to make said edges liquid resistant. These edges do not have the metal protective surface that enables the edges of the gasket contiguous to the cylinder bores to withstand the high temperatures and pressures produced by fuel explosions in the cylinders, but are highly resistant to coolants, lubricants and fuels because of the resin treatment.

Maximum sealing efficiency for the gasket is attained by compressing the gasket between the cylinder block and head to its minimum thickness throughout its area. When the gasket is positioned on a cylinder block and the head is tightened in place, the pressure first compresses the rim portions of the gasket until they are flush with the body portion of the gasket, unless the rim and body portions were flush initially. Thereafter, continued pressure compresses the rim and body portions of the gasket simultaneously. The rim portion forms a seal between the block and head when it has been compressed to its minimum thickness. Accordingly, when the rim portions are compressed into sealing engagement, the seal is complete and extends throughout the area of the gasket.

By limiting gaskets formed in accordance with the present invention to a maximum compressed thickness of 0.030 inch, the performance of a typical high compression is markedly improved. For example, when a gasket formed in accordance with the present invention having a thickness of 0.028 inch is substituted for a typical prior art gasket having a thickness of 0.052 inch in an engine having a compression ratio of 10:1, the compression ratio is increased to 10.57:1. This very significant change in compression ratio results in better engine efficiency, higher horsepower output, and improved gas mileage. Heretofore, those skilled in the art did not believe that gaskets as thin as those disclosed herein, i.e., less than 0.030 inch, and particularly wherein the compressible section of the filler means of such gaskets have a maximum thickness of 0.015 inch, would be sufficiently compressible to form a satisfactory seal between a cylinder head and block. However, gaskets as disclosed herein have not only functioned to effect a remarkably efficient seal, but also such gaskets have reduced torque loss of the assembly to a level which completely obviates the necessity of retightening the head bolts after the gasket has been used for a period of time.

The structure by means of which the above mentioned and other advantages of the invention are attained will be described in the following specification, taken in conjunction with the accompanying drawings showing several embodiments of the invention, in which:

FIG. 1 is a fragmentary top plan view of a gasket embodying the invention, with portions thereof broken away to facilitate illustration of the structure;

FIG. 2 is an enlarged fragmentary top plan view of a portion of the gasket contiguous to one of the cylinder bores, with portions broken away as in FIG. 1;

FIG. 3 is an enlarged cross-sectional view, taken along the line 3—3 of FIG. 1;

FIG. 4 is a view similar to FIG. 3, showing another embodiment of the invention;

FIG. 5 is a view, similar to FIG. 1, showing another embodiment of the invention;

FIG. 6 is an enlarged cross-sectional view, taken along the line 6—6 of FIG. 5;

FIG. 7 is a fragmentary top plan view of a further embodiment of the invention;

FIG. 8 is an enlarged sectional view taken generally along line 8—8 of FIG. 7; and FIG. 9 is an enlarged top perspective view looking generally in the direction of line 8—8 of FIG. 7.

In the embodiment of the invention shown in FIGS. 1 to 3 of the drawings, gasket 11 comprises a thin sheet 12 of cold rolled steel, preferably tin plated, forming the bottom layer of the gasket, a second thin sheet 13 of similar steel forming the top layer of the gasket, a bottom filler sheet 14 and a top filler sheet 15. All four sheets are approximately coextensive in area and are provided with a plurality of aligned apertures 16 adapted to register with the cylinder bores in the cylinder block on which the gasket is to be seated in use. All four sheets are also provided with openings to register with each of the openings provided in the cylinder block, such as, for example, screw or bolt holes.

The filler means comprises two sheets which may be woven or nonwoven, and are preferably made of nonwoven cotton fibers, but may be made of other natural fibers, such as flax, for example, or synthetic fibers, such as nylon 7, for example, which are highly resistant to disintegration by heat. These characteristics of the fibers help to make the gasket capable of withstanding the temperature and pressure conditions encountered by it when it is used in a high compression engine. A layer of fibers is impregnated with thermosetting resin, suitably a phenol-formaldehyde resin, melamine-formaldehyde resin, epoxy resin, etc., to form a filler sheet that is then treated to cure the resin. The filler sheet is resistant to fluids and gases, is non-wicking, and will not flow or disintegrate under heat and pressure conditions that normally exist in a high compression engine during operation of the engine. In use, the filler sheets are compressible without being subject to lateral deformation either under pressure alone, or under heat and pressure.

The impregnation of the layer of fibers with the resin enables the filler sheets to have a calendered finish which makes it possible to control the thickness of the filler sheet with precision and to form a very thin sheet of uniform thickness throughout its area. A gasket having a total thickness in excess of 0.030 inch is not commercially desirable for use in sealing the cylinder bores of high compression automobile engines. In one embodiment of the invention, the filler sheets are each preferably 0.007 inch thick, but may have any thickness within the range of from 0.0065 to 0.0075 inch, with the maximum thickness of the compressible filler means being 0.015 inch. The outer metal sheets preferably have a thickness of 0.006 inch, but may be of any thickness within the range of from 0.0055 to 0.007 inch. In this gasket, each filler sheet is approximately 0.001 inch thicker than each metal sheet. This difference in thickness between the filler sheets and the metal sheets makes the body portion of the gasket approximately 0.001 inch thicker than the rim portion and provides an effective seal over the entire area of the gasket when the gasket is compressed in the position in which it is used. A gasket comprising two filler sheets and two outer metal sheets of the thicknesses specified above will not exceed the 0.030 inch limit of commercial acceptance for gaskets to be used in high compression automobile engines.

As shown best in FIG. 3, the bottom metal sheet has an upstanding flange 17 forming aperture 16 that is adapted to be aligned with one of the cylinder bores of the engine block on which the gasket is to be used. The bottom filler sheet is cut in such a manner that the edge 18 is adjacent one surface of the upstanding flange. The corresponding edge 19 of the top filler sheet is spaced from the aperture far enough to allow the flange to be bent downwardly without overlapping it. The flange 17 is bent downwardly over the edge of the top metal sheet to provide a metal overlap in the form of an annular rim 20 surrounding the aperture. The flange also provides the gasket with a metal protective surface at the edge of the cylinder bore which enables the gasket to withstand the high temperatures and pressures produced by fuel explosions in the cylinders.

Flanges 17 are roll flattened to depress the rim to a uniform extent, but the pressure applied is not sufficient to press the rims tightly against the top metal sheet, with the result that rims 20 project a slight distance above the top metal sheet before the gasket is secured in place between the cylinder block and the head of the engine in which it is to be used. The gasket is coated with thermosetting resin by roll coating or spraying, and is then treated to cure the resin. The surface coating of resin on the exposed faces of the gasket insures that the gasket will have a uniform intimate contact with the castings between which the gasket is positioned. The resin coating also seals the edges of the gasket contiguous to the holes that are not provided with the metal protective surfaces provided by flanges 17 adjacent apertures 16.

When the cylinder head is secured to the block, the pressure is applied first against rims 20, following which the entire gasket is compressed until the rim portions reach their minimum thickness and prevent any further flattening action. The width of the annular rim 20 is less than the lateral distance between flange 17 and the adjacent edge of the top filler sheet. when the gasket is compressed, rim 20 fits into the annular space between flange 17 and edge 19, and edge portion 21 of the top metal sheet is pressed downwardly against the upper surface of the bottom filler to form a rim portion comprising three thicknesses of metal and one thickness of the lower filler sheet.

The entire gasket is compressed to uniform thickness, but the body portion of the gasket is thicker than the minimum thickness of the rim portion because it includes the additional thickness of the upper filler sheet over the thickness of metal rim 20. Thus, the body portion of the gasket is compressed into sealing engagement between the cylinder block and the head when the rim portion is compressed to its minimum thickness.

In the embodiment of the invention shown in FIG. 4, the outer metal sheets of the gasket are identical to the embodiment of FIGS. 1 to 3, and will be identified by the same reference numerals. The filler means of this embodiment comprises a sheet 22 of fibers highly resistant to heat, as, for example, asbestos, and a thin metal shim 23 positioned between the upper surface of sheet 22 and upper metal sheet 13. As in the embodiment of FIGS. 1 to 3, outer metal sheets 12 and 13 are of uniform thickness within a range of from 0.0055 to 0.007 inch. Metal shim 23 is also uniform in thickness within the same range as the outer metal sheets.

The asbestos fibers are impregnated with a binder, suitably a synthetic elastomer, such as, for example, neoprene, and formed into sheets of approximately the same thickness as the thickness of the filler sheets of the embodiment of FIGS. 1 to 3. A sheet 22 is positioned on the upper surface of bottom metal sheet 12 with its edges 24 adjacent flanges 17. A metal shim 23 is positioned on the upper surface of sheet 22 with its edges 25 corresponding to edges 24 of sheet 22, spaced inwardly from edges 24 a sufficient distance to allow flange 17 to be bent downwardly without overlapping them. Upper metal sheet 13 is positioned on top of metal shim 23, the flange 17 is bent inwardly and downwardly over the adjacent edges portion 21 of upper metal plate 13 to from a rim 20 clamping the upper metal plate and the metal shim in place. When the head is tightened against the engine blcok, rim 20 is moved downwardly until it is flush with the upper surface of outer metal sheet 13. Continued downward pressure forces plate 13 and rim 20 downwardly until the rim portions reach their minimum thickness. As plate 13 is being forced downwardly, sheet 22 is compressed to a uniform thickness within the desired range of from .0065 to 0.0075 inch, thus providing a gasket having filler means comprising a sheet of asbestos fibers with a total overall thickness less than 0.030 inch. In the embodiment of FIG. 4, with the edge of each flange 20 being substantially in alignment with the edge 25 of the shim openings, it will be appreciated that a substantially uniform thickness of metal is provided throughout the gasket, so that the gasket has uniform compressibility characteristics.

In the embodiment of FIGS. 5 and 6, a gasket 26 comprises a single filler sheet 27, similar to either filler sheet 14, or 22, sandwiched between two thin outer metal sheets 28 and 29. Gasket 26 has apertures 30 adapted to be aligned with the cylinder bores of the engine block and various other openings 31 for bolts, lubricants, coolants, etc. Filler sheet 27 is additionally apertured, as indicated at 32, in a plurality of spaced areas near the outer edges of the gasket for a purpose hereinafter disclosed.

The edges 33 of bottom metal sheet 28 adjacent apertures 30 are bent upwardly and then reversely to form rims 36 overlapping edges 34 of filler sheets 27. The upper surface of rims 36 is flush with the upper surface of top metal sheet 29 and the gap between edges 33 and 35 is very short.

As shown in FIG. 6, metal sheets 28 and 29 are indented, as indicated at 37 and 38, respectively, in the area of each aperture 32, to provide metal-to-metal contact between the outer metal sheets through each aperture 32. Metal sheets 28 and 29 are secured together permanently in the area of each aperture 32 by welding, or in any other suitable manner. Instead of indenting both metal sheets, as shown at 37 and 38, an indentation of twice the depth shown may be provided on one metal sheet, and the other metal sheet may be flat.

With the structures of FIGS. 5 and 6, the welds are spaced closely enough to cause upper metal sheet 29 to compress the fibers of sheet 27 to uniform thickness throughout the surface area of the gasket.

In the embodiment of FIGS. 7–9, the gasket is indicated in its entirety at 40, and includes filler means 41 sandwiched between an upper metal sheet 42 and a lower metal sheet 43. The filler means 41 is defined by a compressible layer 44 of asbestos fibers impregnated with a latex binder and a metal shim insert 45. As is evident from FIG. 8, the shim 45 terminates at 45a a substantial distance outwardly of the cylinder openings. As can also be best seen in FIG. 8, the top sheet 42 is perforated at a plurality of spaced locations to provide curved projections 46 that extend downwardly through the compressible layer 44. As in the previous embodiments, the lower sheet 43 is reversely bent at the cylinder openings to provide an outwardly facing annular portion 43a around the cylinder openings so that a substantially uniform amount of metal is present throughout the gasket.

In an exemplary embodiment, the top layer 42 is formed of steel having a thickness of 0.006 inch, and the bottom layer 43 is formed of tin plated steel having a thickness of 0.0083 inch. The increased thickness of the bottom layer provides an increased measure of protection about the cylinder openings. The shim insert 45 is also formed of steel and has a thickness of 0.006 inch in the exemplary embodiment. The asbestos layer 44 has an initial .uncompressed thickness in the range of 0.012–0.015 inch, and the composite gasket structure is compressed to a thickness not greater than 0.030 inch.

The gasket 40 of FIGS. 7–9 may be conveniently formed by first perforating the top layer 42 to form the projections 46, and then roll combining the asbestos layer 44 with the upper sheet 42, such that the projections 46 interlock the asbestos layer with the upper layer. As an alternative to the mechanical interlock provided by projections 46, or supplementary thereto, the asbestos layer 44 may be adhesively secured to the upper layer 42. In the event that asbestos layer 44 is secured to metal layer 42 by adhesive alone, the adhesive is preferably applied to the metal layer 42 by a roller, or the like; and the asbestos layer is subsequently joined to the coated metal between the nip of a pair of rollers, or other suitable combining means.

Suitable adhesives for adhering the metal layer 42 to the asbestos layer 44 are known in the art. Adhesives forming oil-resistant bonds are preferred in one suitable adhesive system comprising a mixture of a natural resin and a synthetic oil-resistant elastomer dispersed in a liquid solvent or dispersant. Suitable natural rosins may be derived from woods and asphalt and include rosins, pitches, bitumens and low-molecular oil resins in aqueous emulsions or organic solvent solutions. Suitable oil-resistant elastomers include polysulfide (Thiokol) and nitrile elastomers in aqueous latices or organic solvent solutions.

After the asbestos layer 44 has ben combined with the upper layer 42, the resulting structure is die cut as a unit to provide the cylinder openings, the coolant openings and the bolt holes. The shim 45 is then die cut separately to provide the bolt holes, coolant opening and enlarged cylinder openings. The bottom layer 42 is then blanked and formed at the cylinder bores, and the shim 45 and composite upper layer 42 and asbestos layer 44 are then placed upon the lower layer 43. The cylinder bore overlapping portions 43 are then rolled downwardly to complete the sandwich structure, and the finished gasket is coated with a synthetic resin to achieve a surface seal between the gasket faces and the adjacent casting surfaces.

In order to show the markedly improved torque retention characteristics of gaskets formed in accordance with the teachings of the present invention, comparative tests were run on an Instron testing machine Model No. TTD, available from Instron Corp., 2500 Washington Street, Canton, Mass. The results of these tests are tabulated herebelow.

TABLE I

| Gasket | Overall Thickness as mfg. in mils | Thickness of Compressible Layer | Compression in mils | Compressed Thickness | Compressibility (%) |
|---|---|---|---|---|---|
| 1 | 73 | 50–55 | 9.8 | 72.2 | 13.4 |
|   | 72.5 | 50–55 | 10.4 | 72.1 | 14.35 |
| 2 | 70.0 | 50–55 | 8.9 | 61.1 | 12.7 |
|   | 71.0 | 50–55 | 10.0 | 61.0 | 14.1 |
| 3 | 51.0 | 30 | 7.7 | 43.3 | 15.1 |
|   | 51.0 | 30 | 7.7 | 43.3 | 15.1 |
| 4 | 46.0 | 40 | 5.7 | 40.3 | 12.4 |
|   | 46.0 | 40 | 5.8 | 40.2 | 12.6 |
| 5 | 34/0 | 30 | 4.2 | 29.8 | 12.4 |
|   | 34.0 | 30 | 4.3 | 29.7 | 12.6 |
| 6 | 49.0 | 40 | 9.7 | 39.3 | 19.8 |
|   | 49.0 | 40 | 10.4 | 38.6 | 21.2 |
| 7 | 32.0 | 12–15 | 2.9 | 29.1 | 9.1 |
|   | 32.0 | 12–15 | 2.9 | 29.1 | 9.1 |
| 8 | 32.0 | 12–15 | 3.0 | 29.0 | 9.4 |
|   | 32.0 | 12–15 | 3.1 | 28.9 | 9.7 |

Gaskets 1–6 are common gaskets that are commercially available, and gaskets 7 and 8 were formed in accordance with the teachings of the present invention. Gasket 1 includes an asbestos filler layer of 50–55 mils sandwiched between upper and lower copper layers 9 mils thick. Gasket 2 in- cludes an asbestos filler layer 50–55 mils thick sandwiched between an upper 7 mil tin plate steel layer and a lower 10 mil tin plate steel bottom layer. Gasket 3 includes a 6 mil perforated steel core having 15 mil asbestos layers on opposite sides thereof, with a 6 mil steel bottom layer being wrapped around the upper asbestos layer at the combustion openings. Gasket 4 includes a 7 mil upset metal core having 20 mil asbestos faces on opposite sides thereof. Gasket 5 includes a 7 mil upset metal core having 15 mil asbestos faces at opposite sides thereof. Gasket 6 includes a 7 mil perforated steel core having 20 mil asbestos faces at opposite sides thereof.

Gaskets 7 and 8 are similar to that illustrated in FIG. 4 of the drawing, and include a filler means having a 12–15 mil asbestos layer and a 6 mil cut back steel shim sandwiched between a 6 mil steel top layer and an 8.3 mil steel bottom layer. As is evident from the compressibility column in Table I, gaskets 7 and 8 have a substantial lower compressibility than the other gaskets that were tested. Since the amount of compressibility is directly proportional to the amount of stress relaxation in the gasket, and hence inversely proportional to the torque retaining ability of the gasket, gaskets 7 and 8 have vastly superior torque retention characteristics.

In order to further substantiate the improved torque retention capabilities of the gaskets of the present invention, several gaskets were tested in a high compression 292 horsepower Ford V-8 that was run for an extended period (100 hours). A standard procedure in the gasket industry was employed to measure retained torque in the cylinder bolts and this test involved scribing a sharp line on the head bolts and the cylinder head at the conclusion of the engine operational test, and then loosening the head bolts at least one-quarter turn. The bolts were then retightened with a calibrated torque wrench until the lines on the bolts and the cylinder head coincide and the torque reading at this time was then recorded. The results of these tests are tabulated herebelow

TABLE II

| Gasket | Torque Loss Average Lb.-Ft. | Torque Loss Average % |
|---|---|---|
| 1 | 21 | 30 |
|   | 21 | 30 |
| 2 | 32 | 46 |
| 3 | 34 | 49 |
| 4 | 14 | 20 |
|   | 12 | 17 |

Gaskets 1–3 are common gaskets that are commercially available, and gaskets 4 were formed in accordance with the teachings of the present invention. Gasket 1 consists of a 7 mil upset metal core with 20 mil asbestos faces on opposite sides thereof. Gasket 2 consists of a 21 mil asbestos billboard filler layer with an 8 mil tin plat steel top layer and a 10 mil tin plate steel bottom layer. Gasket 3 includes a 6 mil perforated steel core with 25 mil asbestos layers on both faces thereof.

Gaskets 4 are similar to those illustrated in FIG. 4 of the drawings, and include filler means of 12–15 mil asbestos layer, and a 6 mil cut back tin plate steel shim sandwiched between a 6 mil tin plate steel top layer and a 8 mil tin plate steel bottom layer. As is evident from the torque loss figures in Table II, the gaskets formed in accordance with the present invention have much higher torque retention characteristics, and in fact obviate the necessity of retorquing which is necessary in other gaskets having a compressible filler means greater than 0.015 inch in order to maintain a proper seal between the cylinder head and the block.

Although preferred embodiments of the invention have been described in considerable detail, it will be understood that the description thereof is intended to be illustrative, rather than restrictive, as many details of construction may be modified or changed without departing from the spirit or scope of the invention. Accordingly, it is not desired to be restricted to the exact construction described.

What is claimed is:

1. A compressible gasket for sealing the cylinder bore of a high compression automobile engine and capable of maintaining its dimensional stability under the temperature and pressure conditions encountered in use in such an engine, said gasket having a total compressed thickness of less than .030 inch and comprising two outer metal sheets and filler means sandwiched between said metal sheets, said metal sheets and said filler means each having apertures in registration with one another, including combustion openings, and each lamina having generally parallel planar faces whereby each lamina is of substantially uniform thickness, said filler means including a compressible layer comprised of asbestos fibers impregnated with a binder and having a maximum compressed thickness of 0.015 inch, said filler means also including a single metal shim between said layer of fibers and one of said sheets, at least some of the apertures in said shim at said combustion openings being spaced concentrically outwardly of the registering apertures in said layer of fibers, one of said sheets having first portions extending through said last mentioned apertures and second reversely bent portions extending outwardly into a position substantially vertically aligned with last mentioned shim apertures whereby a four layer laminate is provided around said combustion openings including a double thickness of said one metal sheet, a single thickness of the other of said metal sheets, and said compressible layer thereby providing substantially uniform compressibility characteristics throughout said gasket, the exposed surfaces of said gasket being coated to provide a means for insuring that the gasket will intimately and uniformly contact the facing surfaces of a cylinder head and block.

2. A compressible gasket as set forth in claim 1 including means, cooperating with one of said metal sheets and said layer of non-metallic fibers, for preventing said layer of non-metallic fibers from moving relative to said one metal sheet.

3. A compressible gasket as set forth in claim 2 wherein said movement preventing means includes bonding media connecting said one metal sheet to said layer of non-metallic fibers at least over a portion of the interface between said one metal sheet and said layer of non-metallic fibers.

4. A compressible gasket as set forth in claim 3 wherein said bonding media includes outwardly struck portions of said one metal sheet that are embedded in said layer of non-metallic fibers.

5. A compressible gasket as set forth in claim 3 wherein said bonding media includes adhesive means interposed between said one metal sheet and said layer of non-metallic fibers.

* * * * *

UNITED STATES PATENT OFFICE
CERTIFICATE OF CORRECTION

Patent No. 3,738,558          Dated June 12, 1973

Inventor(s) Otha Leroy Colwell

It is certified that error appears in the above-identified patent and that said Letters Patent are hereby corrected as shown below:

Col. 1, line 64, "avohds" should be -- avoids --;

Col. 2, line 24, "in" (second occurrence) should be -- is --;

Col. 4, lines 4 and 5, "prefered" should be -- preferred --;

Col. 6, line 56, "when" should be -- When --;

Col. 7, line 29, "the" should be -- and --;

line 30, "edges" should be -- edge --;

line 31, "from" should be -- form --;

line 33, "blcok" should be -- block --;

line 61, "sheets" should be -- sheet --;

Col. 8, line 19, the *a* in "45a", should be italicized;

line 54, after "metal" insert -- layer --;

line 56, "perferated" should be -- perforated --;

Col. 10, line 6, after "V-8" insert -- engine --;

Signed and sealed this 26th day of March 1974.

(SEAL)
Attest:

EDWARD M. FLETCHER, JR.
Attesting Officer

C. MARSHALL DANN
Commissioner of Patents